United States Patent
Rathinasabapathy et al.

(10) Patent No.: US 10,635,426 B2
(45) Date of Patent: Apr. 28, 2020

(54) RUNTIME DEPLOYMENT OF PAYLOADS IN A CLOUD SERVICE

(71) Applicant: Microsoft Technology Licensing, LLC, Redmond, WA (US)

(72) Inventors: Mangalam Rathinasabapathy, Bellevue, WA (US); Rakesh Patnaik, Redmond, WA (US); Srigopal Chitrapu, Bellevue, WA (US); Baskar Narayanan, Sammamish, WA (US); Tom Wunshe Tseng, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 294 days.

(21) Appl. No.: 15/462,485

(22) Filed: Mar. 17, 2017

(65) Prior Publication Data

US 2018/0267787 A1 Sep. 20, 2018

(51) Int. Cl.
*G06F 9/44* (2018.01)
*G06F 8/65* (2018.01)
*H04L 29/08* (2006.01)
*G06F 16/13* (2019.01)
*G06F 16/182* (2019.01)

(52) U.S. Cl.
CPC .............. *G06F 8/65* (2013.01); *G06F 16/137* (2019.01); *G06F 16/183* (2019.01); *H04L 67/06* (2013.01); *H04L 67/1097* (2013.01)

(58) Field of Classification Search
CPC .............. G06F 8/65; G06F 8/658; G06F 8/71
See application file for complete search history.

(56) References Cited

U.S. PATENT DOCUMENTS

| | | | |
|---|---|---|---|
| 7,296,261 B2 | 11/2007 | Witchel et al. | |
| 8,024,307 B2 * | 9/2011 | Imai | G06F 16/152 707/698 |
| 8,498,965 B1 | 7/2013 | Ren et al. | |
| 8,578,359 B2 | 11/2013 | Meller et al. | |
| 8,677,315 B1 | 3/2014 | Anderson et al. | |
| 8,713,555 B1 | 4/2014 | Feeser | |
| 8,726,264 B1 * | 5/2014 | Allen | G06F 8/68 717/168 |
| 9,146,721 B1 | 9/2015 | Nagaraja et al. | |
| 9,459,987 B2 | 10/2016 | Weaver et al. | |

(Continued)

OTHER PUBLICATIONS

"Deploying and Updating Applications", https://help.hana.ondemand.com/help/frameset.htm?e5dfbc6cbb5710149279f67fb43d4e5d.html, Retrieved on: Jan. 23, 2017, 2 pages.

*Primary Examiner* — Duy Khuong T Nguyen

(57) ABSTRACT

Aspects of the present disclosure relate to systems and methods for deploying payloads in a cloud service. In one aspect, one or more payloads may be deployed to a plurality of sample servers. Each of the one or more payloads may include a plurality of files. A hash value may be generated for each file of the plurality of files. A master hash value may be generated for each payload from the generated hashes for each file of the plurality of files. It may be determined whether the one or more payloads have changed since a previous deployment of the one or more payloads. When it is determined that at least one payload of the one or more payloads has changed, the at least one changed payload may be deployed to a plurality of data servers.

20 Claims, 5 Drawing Sheets

(56) References Cited

U.S. PATENT DOCUMENTS

| | | | |
|---|---|---|---|
| 9,519,469 B2 | 12/2016 | Li | |
| 2003/0182652 A1* | 9/2003 | Custodio | G06F 8/61 |
| | | | 717/122 |
| 2006/0130037 A1* | 6/2006 | Mackay | G06F 8/658 |
| | | | 717/168 |
| 2006/0248522 A1 | 11/2006 | Lakshminarayanan et al. | |
| 2007/0250671 A1* | 10/2007 | Lyon | G06F 11/1453 |
| | | | 711/162 |
| 2014/0282475 A1* | 9/2014 | Bagal | G06F 8/65 |
| | | | 717/171 |
| 2015/0163288 A1 | 6/2015 | Maes et al. | |
| 2016/0062765 A1 | 3/2016 | Ji et al. | |
| 2016/0085631 A1* | 3/2016 | Madiraju Varadaraju | |
| | | | G06F 11/1451 |
| | | | 707/653 |

\* cited by examiner

RUNTIME DEPLOYMENT OF PAYLOADS IN A CLOUD SERVICE

BACKGROUND

When managing, and troubleshooting cloud services, signals from the servers of the cloud service may be used to identify and mitigate service issues. In some cases, the signals are generated from multiple services deployed on the servers. In this regard, many services and/or updates to the services may be regularly deployed to the servers. Current techniques for deploying services and/or updates to the services to the servers include deploying all new versions of services and/or identifying changes in the source code of the services. As such, current techniques for deploying services and/or updates to the services to the servers may be time consuming, ultimately resulting in a loss of agility in getting features quickly and efficiently. Furthermore, relying on source code for updates to services may lead to inaccurate updates.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for deploying payloads in a cloud service. In one aspect, one or more payloads may be deployed to a plurality of sample servers. Each of the one or more payloads include a plurality of files. It may be determined which files of the plurality of files are included in an exclusion list. A hash value for each file of the plurality of files not included in the exclusion list may be generated. A master hash value may be generated for each payload from the generated hashes for each file of the plurality of files. It may be determined whether the one or more payloads have changed since a previous deployment of the one or more payloads. When it is determined that at least one payload of the one or more payloads has changed, the at least one changed payload may be deployed to a plurality of data servers.

In another aspect, a method for identifying payload changes during run-time of a cloud service is provided. In one aspect, one or more payloads may be deployed to a plurality of sample servers. Each of the one or more payloads may include a plurality of files. A hash value may be generated for each file of the plurality of files. A master hash value may be generated for each payload from the generated hashes for each file of the plurality of files. It may be determined whether the one or more payloads have changed since a previous deployment of the one or more payloads. When it is determined that at least one payload of the one or more payloads has changed, the at least one changed payload may be deployed to a plurality of data servers.

In yet another aspect, a current version of a payload may be deployed to a plurality of sample servers. In one example, the payload includes a plurality of files. At each sample server of the plurality of sample servers, a hash value for each file of the plurality of files may be generated. At each sample server of the plurality of sample servers, a master hash value maybe generated for the current version payload from the generated hashes for each file of the plurality of files. When a master hash value of a previous version of the current version payload is stored in a hash database, the master hash value of the current version payload maybe compared with the master hash value of the previous version payload. When the master hash value of the current version payload is different from the master hash value of the previous version payload, the current version payload may be marked as valid for a current deployment.

DESCRIPTION OF THE DRAWINGS

The detailed description is made with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
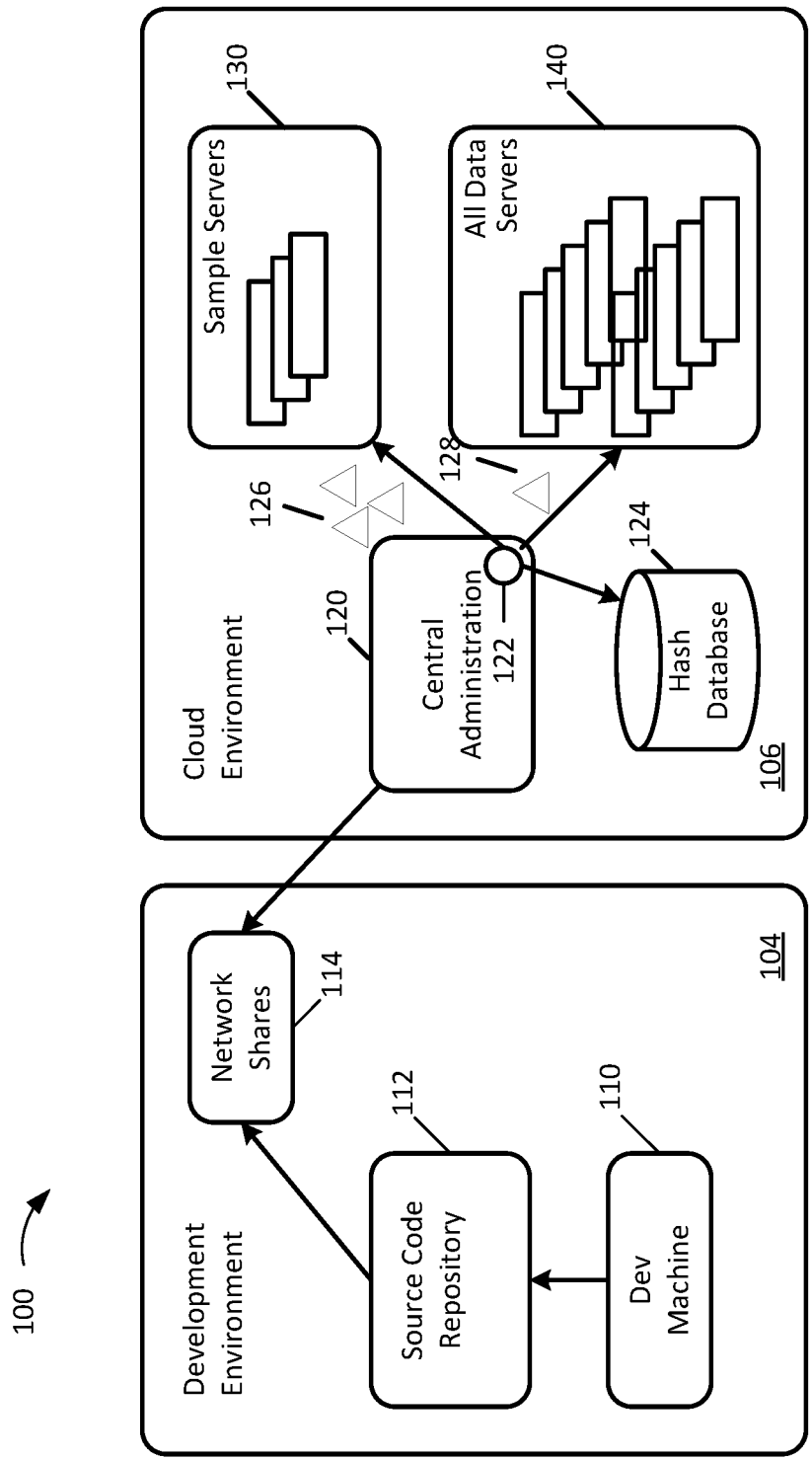
FIG. 1 illustrates an exemplary delta deployment system for deploying payloads in a cloud service, according to an example aspect.

Aspects of the disclosure are generally directed to deploying payloads in a cloud service. For example, a payload may be a service and/or agent for gathering signals and data from the servers on which the payloads are deployed. The gathered signals and data may be used for troubleshooting and/or mitigating issues associated with the servers. Optimization logic may be used to deploy only payloads that have changed. For example, payload changes may be identified during runtime of the cloud service. In this regard, payload bits that have changed may be identified during runtime of the cloud service. In one example, payload bits that have changed from a previous version of the payload may be identified for deployment in the cloud service. As such, the number of payloads that get deployed in each deployment may be reduced. In turn, the payloads may be deployed efficiently and quickly, ultimately resulting in quicker deployments and getting updated features more quickly. Furthermore, identifying and deploying payload changes during runtime facilitates an accurate deployment of updated and/or changed features of the services.

As discussed above, current techniques for deploying services and/or updates to the services to the servers include deploying all new versions of services and/or identifying changes in the source code of the services. As such, current techniques for deploying services and/or updates to the services to the servers may be time consuming, ultimately resulting in a loss of agility in getting features quickly and efficiently. Furthermore, relying on source code for updates to services may lead to inaccurate updates. Accordingly, aspects described herein include techniques for deploying payloads efficiently and quickly by deploying only payload changes and identifying payload changes during runtime of the cloud service. For example, one or more payloads may be deployed to a plurality of sample servers. Each of the one or more payloads include a plurality of files. In one example, each payload of the one or more payloads is deployed to each sample server of the plurality of sample servers. For example, the one or more payloads may be deployed to a first sample server where a hash value for each file of the plurality of files may be generated. A master hash value for each payload from the generated hashes for each file of the plurality of files may be generated at the first sample server. In another example, the one or more payloads may be deployed to a second sample server where a hash value for each file of the plurality of files is generated. A master hash value for each payload from the generated hashes for each file of the plurality of files may be generated at the second sample server. In another example, the one or more payloads may be deployed to a third sample server where a hash value for each file of the plurality of files is generated. A master hash value for each payload from the generated hashes for each file of the plurality of files may be generated at the third sample server. The one or more payloads may be deployed to any number and/or combination of sample servers. In this regard, hash values and master hash values may be generated at each sample server.

In one example, the hash values generated for each file and the master hash values generated for each payload may be stored in a hash database. As such, it may be determined whether the one or more payloads have changed since a previous deployment of the one or more payloads. For example, the master hash value of a current payload may be compared with the master hash value of a previous version of the payload (e.g., stored in the hash database). When it is determined that a payload has changed, the changed payload may be deployed to a plurality of data servers in the cloud service.

As such, a technical effect that may be appreciated is that by deploying only payload changes and identifying payload changes during runtime of the cloud service, processor load may be reduced, memory may be conserved, and network bandwidth usage may be reduced. Another technical effect that may be appreciated is that users of the cloud service may quickly, easily, and efficiently view updates and/or changes to the cloud service facilitating a compelling visual and functional experience to allow a user to efficiently interact with a user interface while using the cloud service.

Referring now to the drawings, in which like numerals represent like elements through the several figures, aspects of the present disclosure and the exemplary operating environment will be described. With reference to FIG. 1, one aspect of a delta deployment system 100 for deploying payloads in a cloud service is illustrated. The delta deployment system 100 may include a development environment 104 and a cloud environment 106. In aspects, the delta deployment system 100 may be implemented in the development environment 104. The development environment 104 is where source code for the services/payloads described herein is written, built, and compiled into installers for the delta deployment system 100. The development environment 104 may include a development machine 110, a source code repository 112, and network shares 114. In one example, the development machine 110 may include a client computing device. In a basic configuration, the client computing device is a handheld computer having both input elements and output elements. The client computing device may be any suitable computing device for implementing the delta deployment system 100 for deploying payloads in a cloud service. For example, the client computing device may be at least one of: a mobile telephone; a smart phone; a tablet; a phablet; a smart watch; a wearable computer; a personal computer; a desktop computer; a laptop computer; a gaming device/computer (e.g., Xbox); a television; etc. This list is exemplary only and should not be considered as limiting. Any suitable client computing device for implementing the delta deployment system 100 for deploying payloads in a cloud service may be utilized.

In examples, the source code repository 112 may include source code repositories such as Team Foundation Server (TFS), GIT, Source Depot, and the like. As such, source code written using the development machine 110 may be uploaded to the source code repository 112. The source code repository 112 may be configured to build and compile the source code into libraries and/or installers. The libraries and/or installers may be sent to the network shares 114. In one example, the network shares 114 include one or more computer resources for sharing items, e.g., files, over a network. The libraries and/or installers may be included in one or more services (e.g., payloads) as part of a deployment. In this regard, the deployment including the one or more payloads may be sent to a destination service (e.g., the cloud environment 106).

In aspects, the delta deployment system 100 may be implemented in the cloud environment 106. In one example, the cloud environment 106 may include a cloud service such as OneDrive, SharePoint, Google Drive, Dropbox, and the like. The cloud environment 106 may provide data to and from the development environment 104 through a network, for example. In aspects, the delta deployment system 100 may be implemented on more than one cloud environment 106, such as a plurality of cloud environments 106. As discussed above, the cloud environment 106 may provide data to and from the development environment 104 through a network. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. In another aspect, the delta deployment system 100 may be implemented as a web-based application. In one example, the web-based application may include any client-server software application where the client (e.g., user interface) runs in a web-browser and/or any component capable of rendering HTML, Flash, Silverlight, and the like.

As illustrated in FIG. 1, the cloud environment 106 may include a central administration 120, a hash database 124, a plurality of sample servers 130, and a plurality of data servers 140. The central administration 120 may be configured to manage the cloud service/cloud environment 106. For example, the central administration 120 may know how many servers exist in the cloud environment 106, who is on the servers, how to disconnect and/or take a server offline, how to reconnect and/or put a server back online, and the like. In one example, the central administration 120 includes one or more jobs 122. The one or more jobs 122 may connect to the network shares 114. In this regard, the one or more jobs 122 may get a deployment including the installers/payloads from the network shares 114 for deployment to the data servers 140. In the example illustrated in FIG. 1, the deployment may include one or more payloads 126. The one or more payloads 126 may include a plurality of files. In one example, the one or more payloads 126 may be sent to the plurality of sample servers 130. In one example, the plurality of sample servers 130 may be configured to generate a hash value for each file of the plurality of files. In this regard, each file of the plurality of files for each payload may have a generated hash value. In another example, the sample servers 130 may be configured to generate a master hash value for each payload from the generated hashes for each file of the plurality of files. For example, the master hash value of each payload may be generated using the hash values of each file of the plurality files of the corresponding payload. In one example, the hash values of each file and/or the master hash value of each payload may be generated using hashing techniques known to the those skilled in the art.

In some examples, each payload of the one or more payloads 126 is sent to a first sample server of the plurality of sample servers 130. In one example, at the first sample server, a hash value may be generated for each file of the plurality of files for a first payload of the one or more payloads 126. At the first sample server, a master hash value may be generated for the first payload using the generated hashes from each file of the plurality of files included in the first payload. In another example, at the first sample server, a hash value may be generated for each file of the plurality of files for a second payload of the one or more payloads 126. At the first sample server, a master hash value may be generated for the second payload using the generated hashes from each file of the plurality of files included in the second payload. In another example, at the first sample server, a hash value may be generated for each file of the plurality of files for a third payload of the one or more payloads 126. At the first sample server, a master hash value may be generated for the third payload using the generated hashes from each file of the plurality of files included in the third payload.

In other examples, each payload of the one or more payloads 126 is sent to a second sample server of the plurality of sample servers 130. In one example, at the second sample server, a hash value may be generated for each file of the plurality of files for a first payload of the one or more payloads 126. At the second sample server, a master hash value may be generated for the first payload using the generated hashes from each file of the plurality of files included in the first payload. In another example, at the second sample server, a hash value may be generated for each file of the plurality of files for a second payload of the one or more payloads 126. At the second sample server, a master hash value may be generated for the second payload using the generated hashes from each file of the plurality of files included in the second payload. In another example, at the second sample server, a hash value may be generated for each file of the plurality of files for a third payload of the one or more payloads 126. At the second sample server, a master hash value may be generated for the third payload using the generated hashes from each file of the plurality of files included in the third payload.

In other examples, each payload of the one or more payloads 126 is sent to a third sample server of the plurality of sample servers 130. In one example, at the third sample server, a hash value may be generated for each file of the plurality of files for a first payload of the one or more payloads 126. At the third sample server, a master hash value may be generated for the first payload using the generated hashes from each file of the plurality of files included in the first payload. In another example, at the third sample server, a hash value may be generated for each file of the plurality of files for a second payload of the one or more payloads 126. At the third sample server, a master hash value may be generated for the second payload using the generated hashes from each file of the plurality of files included in the second payload. In another example, at the third sample server, a hash value may be generated for each file of the plurality of files for a third payload of the one or more payloads 126. At the third sample server, a master hash value may be generated for the third payload using the generated hashes from each file of the plurality of files included in the third payload.

While the examples described herein include three payloads and three sample servers, it is appreciated that a deployment may include any number of payloads 126 and the plurality of sample servers 130 may include any number of sample servers. In one example, the plurality of files included in the one or more payloads 126 may include excluded files. For example, at least some of the plurality of files may have changed while not changing the functionality of the payload. For example, even though a file may have changed the payload does not change. In this example, the excluded files may be included in an exclusion list. A hash value may not be generated for files included in the exclusion list. As such, generating hash values of each file may be more efficient. In one example, the generated hash values for each file may be stored in the hash database 124. In another example, the generated master hash values for each payload of the one or more payloads 126 may be stored at the hash database 124. The hash database 124 may include any database capable of storing the hash values and master hash values. In one example, it may be determined whether hash values and/or master hash values of a previous version of a current payload are stored in the hash database 124.

In one case, when the hash values and/or master hash values of a previous version of the current payload are not stored in the hash database 124, the hash values and/or master hash values of the current payload are stored in the hash database 124. In this example, the current payload may be part of a first deployment. As such, the hash values and/or master hash values of the current payload may be stored in the hash database 124 as a first version of the hash values and/or master hash values. In this regard, when a second deployment including a second version of the payload is processed, a second version of the hash values and/or master hash values may be generated. In this regard, when the hash values and/or master hash values of a previous version of the current payload are stored in the hash database 124, it may be determined whether the current payload has changed since the previous deployment of the current payload.

In one example, the master hash value of each payload of the one or more payloads 126 may be compared with a previously generated master hash value of each corresponding payload. When it is determined that at least one payload of the one or more payloads 126 is the same as a corresponding payload from the previous deployment, the at least one payload determined to be the same as the corresponding payload from the previous deployment may be marked as not valid for a current deployment. When it is determined that at least one payload of the one or more payloads 126 has changed, the at least one changed payload may be deployed to the plurality of data servers 140. Using the example described above, the master hash value of the second version of the payload may be compared with the master hash value of the first/previous version of the payload. If it is determined that the master hash value of the second version of the payload is the same as the master hash value of the first/previous version of the payload, the second version of the payload may be marked as not valid for the current deployment. If it is determined that the second version of the payload has changed, the second version of the payload may be deployed to the plurality of data servers 140. In the example illustrated in FIG. 1, a changed payload 128 may be deployed to the plurality of the data servers 140. In another example, the changed payload 128 may be marked as valid for the current deployment before being deployed to the plurality of the data servers 140. In one example, the plurality of data servers 140 are configured to receive, process, store, and send data and/or information associated with the delta deployment system 100. For example, the plurality of data servers 140 may include at least file storage providers, external activity services and document editing clients.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval, and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 2:
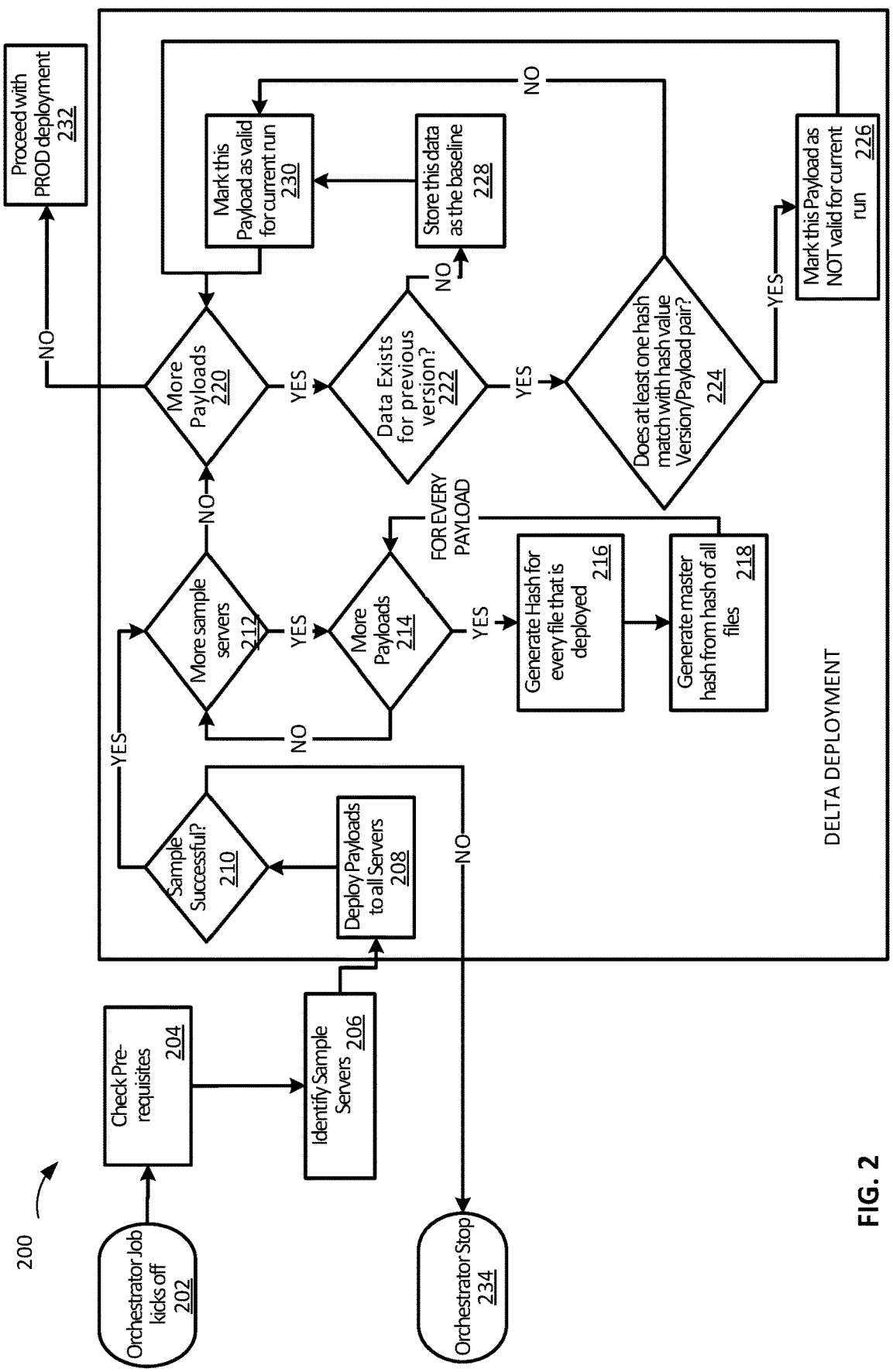
FIG. 2 illustrates an exemplary delta deployment process for deploying payloads in a cloud service, according to an example aspect.

With reference now to FIG. 2 a delta deployment process 200 for deploying payloads in a cloud service, according to an example aspect is illustrated. In one example, the delta deployment process 200 begins at operation 202 where a job (e.g., from the one or more jobs 122) gets a deployment including one or more payloads (e.g., 126) from the network shares 114 for deployment to the data servers 140. At operation 204, pre-requisites for the deployment may be checked. For example, information and/or functionality of the sample servers and/or data servers may be checked. In another example, it may be determined whether previous processes associated with the delta deployment process have been completed. At operation 206, a plurality of sample servers (e.g., 130) may be identified. In one example, the plurality of sample servers may be randomly selected for processing the deployment of payloads. In another example, the plurality of sample servers may be selected using one or more rules. In one example, three sample servers for processing the deployment may be identified based on the one or more rules. In another example, more than three sample servers for processing the deployment may be identified based on the one or more rules.

When the plurality of sample servers are identified, the plurality of payloads in the current deployment may be deployed to the plurality of sample servers at operation 208. The plurality of payloads may be processed by each sample server of the plurality of identified servers at operation 208. At operation 210, for each identified sample server, it is determined whether the sample server is successful. For example, a statistical analysis may be performed to verify the accuracy of each identified sample server. In this regard, the statistical analysis may verify that each identified sample server generates the same hash value for the plurality of payloads. If any of the identified sample servers are not successful, the job running the deployment may be stopped at operation 234. When the plurality of identified sample servers are successful, the plurality of payloads may be sent to each identified sample server at operation 212. A first sample server of the plurality of sample servers may receive the plurality of payloads. A hash value for each file of a plurality of files included in a first payload may be generated at operation 216. A master hash value for the first payload may be generated from the generated hashes for each file of the plurality of files of the first payload at operation 218. At operation 214 it is determined whether more payloads are included in the plurality of payloads received at the first sample server. When more payloads exist, a hash value for each file of a plurality of files may be generated for each additional payload in the plurality of payloads at operation 216. A master hash value for each additional payload in the plurality of payloads may be generated from the generated hash for each file of the plurality of files of each corresponding additional payload at operation 218. When hash values and master hash values have been generated for each payload of the plurality of payloads received at the first sample server, it is determined whether more sample servers are included in the plurality of identified sample servers at operation 212. When more sample servers are included in the plurality of identified sample servers, the plurality of payloads may be received at the additional sample servers. In this regard, operations 216 and 218 may be performed for the plurality of payloads at each sample server in the plurality of sample servers.

When all the identified sample servers have generated hash values and master hash values for the plurality of payloads, it may be determined whether the plurality of payloads have changed since a previous deployment of the plurality of payloads. At operation 222, it may be determined whether hash values and/or master hash values of a previous version of the plurality of payloads exists. In one example, the hash values and/or master hash values of a previous version of the plurality of payloads may be stored in a hash database. In this regard, when hash values and/or master hash values of a previous version of a first payload of the plurality of payloads is stored in the hash database, the first payload (e.g., the master hash value of the first payload) of the plurality of payloads may be compared with the master hash value of the previous version of the first payload at operation 224. When the master hash value of the previous version of the first payload is the same as the master hash value of the first payload, the first payload may be marked as not valid for the current deployment at operation 226. When the master hash value of the previous version of the first payload is different from the master hash value of the first payload, the first payload may be marked as valid for the current deployment at operation 230.

When hash values and/or master hash values of a previous version of a first payload of the plurality of payloads is not stored in the hash database, the hash values and/or the master hash value of the first payload of the plurality of payloads may be stored in the hash database as a baseline at operation 228. The first payload may be marked as valid for the current deployment at operation 230. At operation 220 it is determined whether more payloads are included in the plurality of payloads. When more payloads exist, it is determined whether the additional payloads have changed since a previous deployment of the additional of payloads. At operation 222

At operation 222, it may be determined whether hash values and/or master hash values of a previous version of the additional payload exists. In one example, the hash values and/or master hash values of a previous version of the additional payload may be stored in the hash database. In this regard, when hash values and/or master hash values of a previous version of the additional payloads are stored in the hash database, the additional payloads (e.g., the master hash values of the additional payloads) may be compared with the master hash value of the previous version of the additional payloads at operation 224. When the master hash value of the previous version of the additional payloads is the same as the master hash value of the additional payloads, the additional payloads may be marked as not valid for the current deployment at operation 226. When the master hash value of the previous version of the additional payloads is different from the master hash value of the additional payloads, the additional payloads may be marked as valid for the current deployment at operation 230.

When hash values and/or master hash values of a previous version of the additional payloads are not stored in the hash database, the hash values and/or the master hash value of the additional payloads may be stored in the hash database as a baseline at operation 228. The additional payloads may be marked as valid for the current deployment at operation 230. When each payload of the plurality of payloads has been marked as valid or not valid for the current deployment, the payloads marked as valid for the current deployment are deployed to a plurality of data servers at operation 232. In one example, the payloads deployed to the plurality of data servers include payloads that have changed since a previous version. In another example, the payloads deployed to the plurality of data servers include payloads that are part of a first deployment (e.g., payloads that are the first version/baseline).

Figure 3:
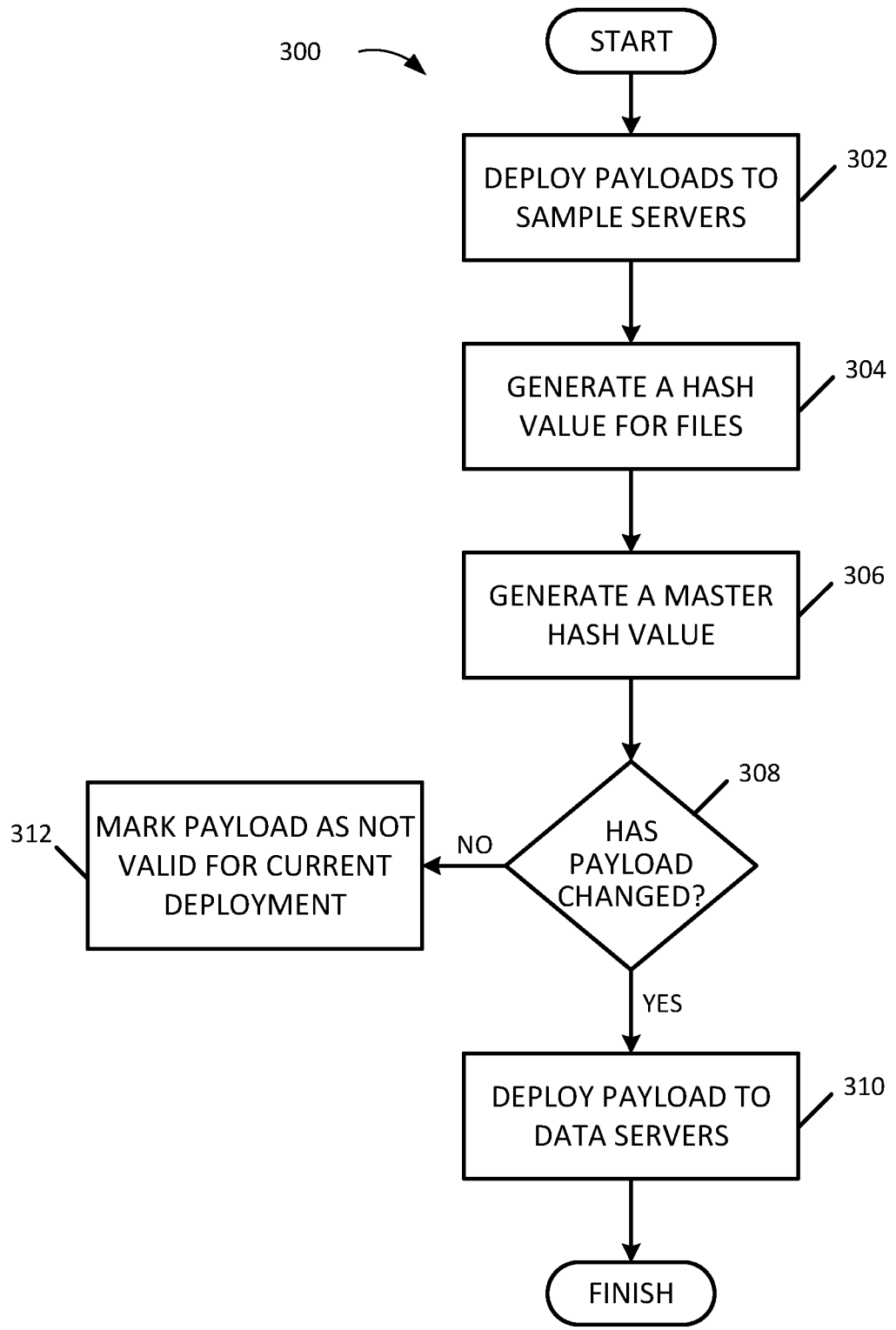
FIG. 3 illustrates an exemplary method for identifying payload changes during run-time of a cloud service, according to an example aspect.

Referring now to FIG. 3, an exemplary method 300 for identifying payload changes during run-time of a cloud service, according to an example aspect is shown. Method 300 may be implemented on a computing device or a similar electronic device capable of executing instructions through at least one processor. Method 300 may begin at operation 302, where one or more payloads are deployed to a plurality of sample servers. In one example, each of the one or more payloads include a plurality of files. A payload may be a service and/or agent for gathering signals and data from the servers on which the payloads are deployed. The gathered signals and data may be used for troubleshooting and/or mitigating issues associated with the servers. The plurality of sample servers include servers in the cloud service for generating hash value of the plurality files and/or master hash values for the one or more payloads. In one example, the one or more payloads may be deployed to a first server of the plurality of samples servers, then a second server of the plurality of sample servers, then a third server of the plurality of sample servers, etc.

When one or more payloads are deployed to a plurality of sample servers, flow proceeds to operation 304 where a hash value for each file of the plurality of files is generated. In one example, the hash value for each file of the plurality of files is generated using standard hashing techniques known to those skilled in the art. For example, a hash function may be applied to the plurality of files to generate hash values for each file. In this regard, each file may be mapped to a hash value. In one example, a hash value for each file of the plurality of files is generated at each sample server of the plurality of sample servers. In one example, the hash values for each file of the plurality of files are stored in a hash database.

When a hash value for each file of the plurality of files is generated, flow proceeds to operation 306 where a master hash value for each payload is generated from the generated hashes for each file of the plurality of files. In one example, the master hash value for each payload of the one or more payloads is generated using standard hashing techniques known to those skilled in the art. For example, a hash function may be applied to the plurality of hashed files to generate master hash values for each payload. That is, a hash function may be applied to the plurality of hashed files included in a payload to generate a master hash value for the payload. In one example, a master hash value for each payload of the one or more payloads is generated at each sample server of the plurality of sample servers. In one example, the master hash values for each payload of the plurality of payloads are stored in a hash database.

At decision operation 308, it is determined whether the one or more payloads have changed since a previous deployment of the one or more payloads. For example, when the one or more payloads are part of at least a second deployment (e.g., a deployment including at least a second version of the one or more payloads), a previous deployment including a previous version of the one or more payloads may exist. In one example, it is determined whether the one or more payloads have changed since a previous deployment of the one or more payloads by comparing the master hash value of each payload of the one or more payloads with a previously generated master hash value of each corresponding payload of the one or more payloads. In one example, the previously generated master hash value of each corresponding payload is stored in the hash database.

When it is determined that at least one payload of the one or more payloads is the same as a corresponding payload from the previous deployment, flow proceeds to operation 312 where the at least one payload determined to be the same as the corresponding payload from the previous deployment is marked as not valid for a current deployment. Each payload of the one or more payloads determined to be the same as its corresponding payload from the previous deployment (e.g., when the master hash value of both payloads match) is marked as not valid for the current deployment. When it is determined that at least one payload of the one or more payloads has changed, flow proceeds to operation 308 where the at least one changed payload is deployed to a plurality of data servers. Each payload of the one or more payloads determined to be different as its corresponding payload from the previous deployment (e.g., determined to have changed) is deployed to the plurality of data servers. In one example, the plurality of data servers are servers running in the cloud service.

Figure 4:
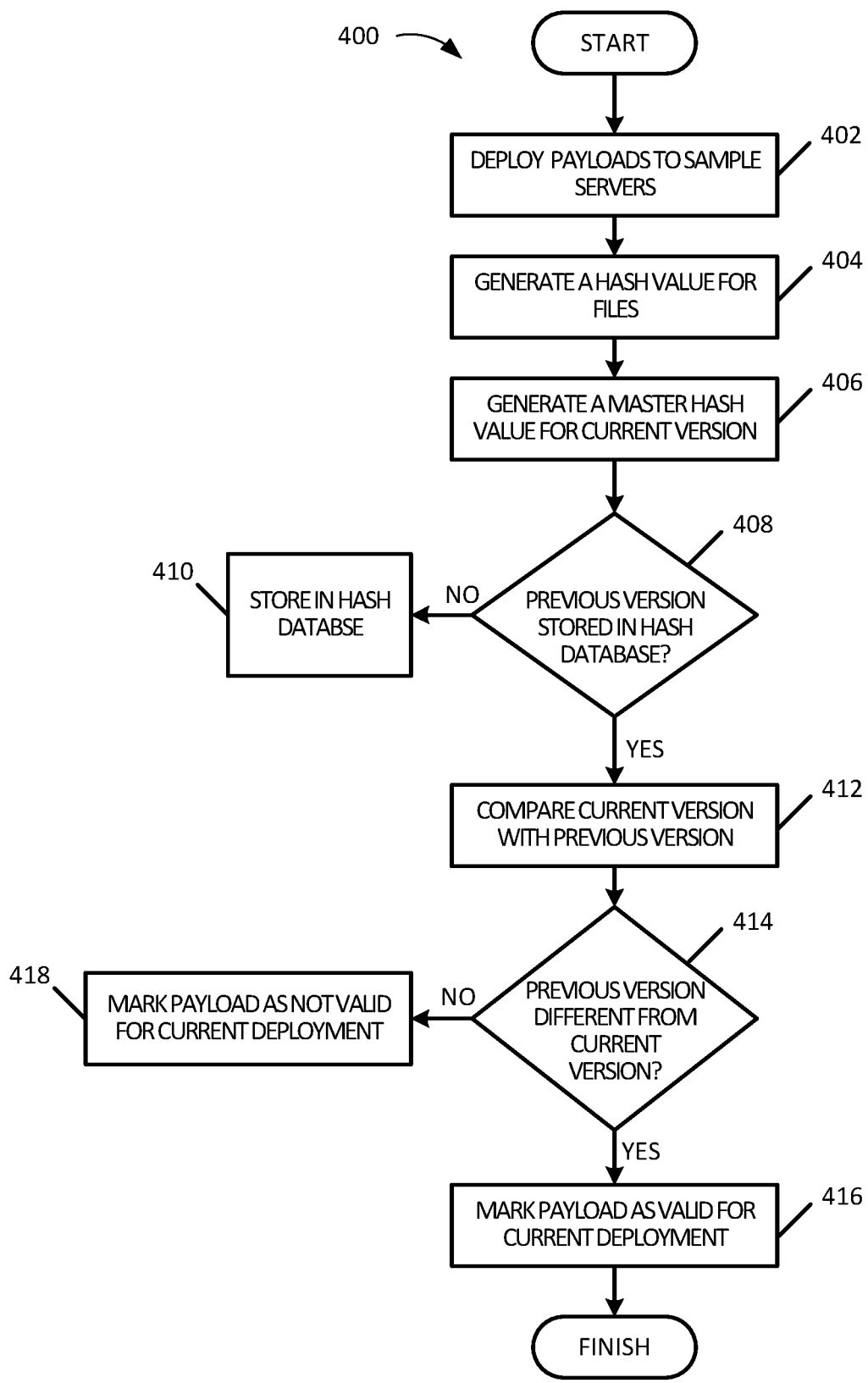
FIG. 4 illustrates an exemplary method for deploying payloads in a cloud service, according to an example aspect.

Referring now to FIG. 4, an exemplary method 400 for deploying payloads in a cloud service, according to an example aspect is shown. Method 400 may be implemented on a computing device or a similar electronic device capable of executing instructions through at least one processor. Method 400 may begin at operation 402, where a current version of a payload is deployed to a plurality of sample servers. In one example, the current version of the payload includes a plurality of files. A payload may be a service and/or agent for gathering signals and data from the servers on which the payloads are deployed. The gathered signals and data may be used for troubleshooting and/or mitigating issues associated with the servers. The plurality of sample servers include servers in the cloud service for generating hash value of the plurality files and/or master hash values for the one or more payloads. In one example, the current payload may be deployed to a first server of the plurality of samples servers, then a second server of the plurality of sample servers, then a third server of the plurality of sample servers, etc.

When the current version of the payload is deployed to a plurality of sample servers, flow proceeds to operation 404 where a hash value for each file of the plurality of files is generated. In one example, the hash value for each file of the plurality of files is generated using standard hashing techniques known to those skilled in the art. For example, a hash function may be applied to the plurality of files to generate hash values for each file. In this regard, each file may be mapped to a hash value. In one example, a hash value for each file of the plurality of files is generated at each sample server of the plurality of sample servers. In one example, the hash values for each file of the plurality of files are stored in a hash database.

When a hash value for each file of the plurality of files is generated, flow proceeds to operation 406 where a master hash value for the current version payload is generated from the generated hashes for each file of the plurality of files. In one example, the master hash value for the current version payload is generated using standard hashing techniques known to those skilled in the art. For example, a hash function may be applied to the plurality of hashed files to generate a master hash value for the current version payload. That is, a hash function may be applied to the plurality of hashed files included in a payload to generate a master hash value for the current version payload. In one example, a master hash value for the current version payload is generated at each sample server of the plurality of sample servers. In one example, the master hash values for the current version payload is stored in a hash database.

At decision operation 408, it is determined whether a master hash value of a previous version of the current version payload is stored in a hash database. For example, the hash database may be queried for the master hash value of the previous version of the current version payload. When the master hash value of the previous version of the current version payload is not stored in the hash database, flow proceeds to operation 410 where the master hash value of the current version payload is stored in the hash database. In this case, the current version payload may be included in a first deployment of the current version payload. In this regard, the master hash value of the current version payload may be stored as a baseline in the hash database. When the master hash value of a previous version of the current version payload is stored in a hash database, flow proceeds to operation 412 where the master hash value of the current version payload is compared with the master hash value of the previous version payload. For example, the master hash value of the current version payload may be compared with the master value of the previous version payload to determine whether the master hash values are the same and/or match.

At decision operation 414, it is determined whether the master hash value of the current version payload is different from the master hash value of the previous version payload. When it is determined that the master hash value of the current version payload is the same as the master hash value of the previous version payload, flow proceeds to operation 418 where the current version payload is marked as not valid for the current deployment. In this regard, payloads where nothing has changed (e.g., there have been no updates) are not deployed. When it is determined the master hash value of the current version payload is different from the master hash value of the previous version payload, flow proceeds to operation 416 where the current version payload is marked as valid for the current deployment. When the master hash value of the current version payload is determined to be different from the mast hash value of the previous version payload, it is determined that the current version payload has changed. In this regard, the current version payload is deployed to a plurality of data servers. As such, only the payloads that have changed (e.g. have been updated) are deployed to the plurality of data servers.

Figure 5:
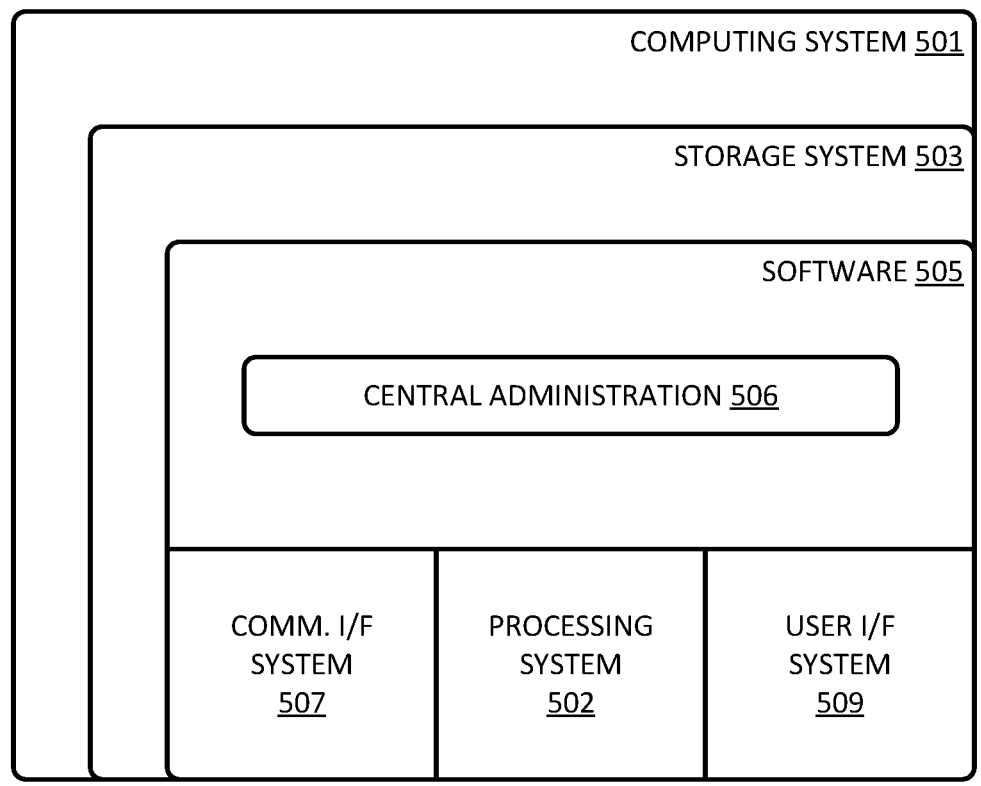
FIG. 5 illustrates a computing system suitable for implementing the enhanced payload deployment technology disclosed herein, including any of the environments, architectures, elements, processes, user interfaces, and operational scenarios and sequences illustrated in the Figures and discussed below in the Technical Disclosure.

FIG. 5 illustrates computing system 501 that is representative of any system or collection of systems in which the various applications, services, scenarios, and processes disclosed herein may be implemented. Examples of computing system 501 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509. Processing system 502 is operatively coupled with storage system 503, communication interface system 507, and user interface system 509.

Processing system 502 loads and executes software 505 from storage system 503. Software 505 includes central administration 506, which is representative of the processes discussed with respect to the preceding FIGS. 1-4. When executed by processing system 502 to enhance payload deployment, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and other circuitry that retrieves and executes software 505 from storage system 503. Processing system 502 may be implemented within a single processing device, but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for implementing enhanced payload deployment.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtual machine software, or other application software, in addition to or that include application 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced payload deployment. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 509 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 509. In some cases, the input and output devices may be combined in a single device, such as a display capable of displaying images and receiving touch gestures. The aforementioned user input and output devices are well known in the art and need not be discussed at length here.

User interface system 509 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems comprising: one or more computer readable storage media; and program instructions stored on the one or more computer readable storage media that, when executed by at least one processor, cause the at least one processor to at least: deploy one or more payloads to a plurality of sample servers, where each of the one or more payloads include a plurality of files; determine which files of the plurality of files are included in an exclusion list; generate a hash value for each file of the plurality of files not included in the exclusion list; generate a master hash value for each payload from the generated hashes for each file of the plurality of files; determine whether the one or more payloads have changed since a previous deployment of the one or more payloads; and when it is determined that at least one payload of the one or more payloads has changed, deploy the at least one changed payload to a plurality of data servers. In further examples, the hash value for each file of the plurality of files not included in the exclusion list is generated at each sample server of the plurality of sample servers. In further examples, the master hash value is generated for each payload at each sample server of the plurality of sample servers. In further examples, to determine whether the one or more payloads have changed since a previous deployment of the one or more payloads, the program instructions, when executed by the at least one process, further cause the at least one processor to compare the master hash value of each payload with a previously generated master hash value of each corresponding payload. In further examples, the previously generated master hash value of each corresponding payload is stored in a hash database. In further examples, the hash value for each file of the plurality of files and the master hash value for each payload is stored in the hash database. In further examples, when it is determined that at least one payload of the one or more payloads is the same as a corresponding payload from the previous deployment, the program instructions, when executed by the at least one process, further cause the at least one processor to mark the at least one payload determined to be the same as the corresponding payload from the previous deployment as not valid for a current deployment. In further examples, the plurality of data servers are associated with a cloud service.

Further aspects disclosed herein provide an exemplary computer-implemented method for identifying payload changes during run-time of a cloud service, the method comprising: deploying one or more payloads to a plurality of sample servers, where each of the one or more payloads include a plurality of files; generating a hash value for each file of the plurality of files; generating a master hash value for each payload from the generated hashes for each file of the plurality of files; determining whether the one or more payloads have changed since a previous deployment of the one or more payloads; and when it is determined that at least one payload of the one or more payloads has changed, deploying the at least one changed payload to a plurality of data servers. In further examples, determining whether the one or more payloads have changed since a previous deployment of the one or more payloads comprises comparing the master hash value of each payload with a previously generated master hash value of each corresponding payload. In further examples, the previously generated master hash value of each corresponding payload is stored in the hash database. In further examples, the computer-implemented method further comprises when it is determined that at least one payload of the one or more payloads is the same as a corresponding payload from the previous deployment, marking the at least one payload determined to be the same as the corresponding payload from the previous deployment as not valid for a current deployment. In further examples, the hash value is generated for each file of the plurality of files not included in an exclusion list. In further examples, the exclusion list includes files that do not change the payload.

Additional aspects disclosed herein include a system comprising: at least one processor; and memory encoding computer executable instructions that, when executed by the at least one processor, perform a method for deploying payloads in a cloud service, the method comprising: deploying a current version of a payload to a plurality of sample servers, where the payload includes a plurality of files; generating, at each sample server of the plurality of sample servers, a hash value for each file of the plurality of files; generating, at each sample server of the plurality of sample servers, a master hash value for the current version payload from the generated hashes for each file of the plurality of files; when a master hash value of a previous version of the current version payload is stored in a hash database, comparing the master hash value of the current version payload with the master hash value of the previous version payload; and when the master hash value of the current version payload is different from the master hash value of the previous version payload, marking the current version payload as valid for a current deployment. In further examples, the system further comprises deploying a current version of another payload to the plurality of sample servers, where the another payload includes a plurality of files; generating, at each sample server of the plurality of sample servers, a hash value for each file of the plurality of files; generating, at each sample server of the plurality of sample servers, a master hash value for the current version another payload from the generated hashes for each file of the plurality of files; when a master hash value of a previous version of the current version another payload is stored in a hash database, comparing the master hash value of the current version another payload with the master hash value of the previous version another payload; and when the master hash value of the current version another payload is different from the master hash value of the previous version another payload, marking the current version another payload as valid for the current deployment. In further examples, the system further comprises when the master hash value of a previous version of the current version payload is not stored in the hash database, storing the master hash value of the current version payload in the hash database. In further examples, when the master hash value of a previous version of the current version another payload is not stored in the hash database, storing the master hash value of the current version another payload in the hash database. In further examples, the system further comprises when the master hash value of the current version payload is the same as the master hash value of the previous version payload, marking the current version payload as not valid for the current deployment; and when the master hash value of the current version another payload is the same as the master hash value of the previous version another payload, marking the current version another payload as not valid for the current deployment. In further examples, the system further comprises deploying the current version payload and the current version another payload to a plurality of data servers in the cloud service.

Techniques for providing runtime deployment of payloads in a cloud service are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of payload deployment systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:

1. A system comprising:
one or more computer readable storage media; and
program instructions stored on the one or more computer readable storage media that, when executed by at least one processor, cause the at least one processor to at least:
deploy one or more payloads to a plurality of sample servers, where each of the one or more payloads include a plurality of files;
determine which files of the plurality of files are included in an exclusion list, wherein the exclusion list includes files that do not change the payload;
generate a hash value for each file of the plurality of files not included in the exclusion list;
generate a master hash value for each payload from the generated hashes for each file of the plurality of files;
determine whether the one or more payloads have changed since a previous deployment of the one or more payloads; and
when it is determined that at least one payload of the one or more payloads has changed, deploy the at least one changed payload to a plurality of data servers.

2. The system of claim 1, wherein the hash value for each file of the plurality of files not included in the exclusion list is generated at each sample server of the plurality of sample servers.

3. The system of claim 1, wherein the master hash value is generated for each payload at each sample server of the plurality of sample servers.

4. The system of claim 1, wherein to determine whether the one or more payloads have changed since a previous deployment of the one or more payloads, the program instructions, when executed by the at least one process, further cause the at least one processor to compare the master hash value of each payload with a previously generated master hash value of each corresponding payload.

5. The system of claim 4, wherein the previously generated master hash value of each corresponding payload is stored in a hash database.

6. The system of claim 5, wherein the hash value for each file of the plurality of files and the master hash value for each payload is stored in the hash database.

7. The system of claim 1, further comprising when it is determined that at least one payload of the one or more payloads is the same as a corresponding payload from the previous deployment, the program instructions, when executed by the at least one process, further cause the at least one processor to mark the at least one payload determined to be the same as the corresponding payload from the previous deployment as not valid for a current deployment.

8. The system of claim 1, wherein the plurality of data servers are associated with a cloud service.

9. A computer-implemented method for identifying payload changes during run-time of a cloud service, the method comprising:
deploying one or more payloads to a plurality of sample servers, where each of the one or more payloads include a plurality of files;

generating a hash value for each file of the plurality of files at each sample server of the plurality of sample servers;

generating a master hash value for each payload from the generated hashes for each file of the plurality of files;

determining whether the one or more payloads have changed since a previous deployment of the one or more payloads; and when it is determined that at least one payload of the one or more payloads has changed, deploying the at least one changed payload to a plurality of data servers.

10. The computer-implemented method of claim 9, wherein determining whether the one or more payloads have changed since a previous deployment of the one or more payloads comprises comparing the master hash value of each payload with a previously generated master hash value of each corresponding payload.

11. The computer-implemented method of claim 10, wherein the previously generated master hash value of each corresponding payload is stored in the hash database.

12. The computer-implemented method of claim 9, further comprising when it is determined that at least one payload of the one or more payloads is the same as a corresponding payload from the previous deployment, marking the at least one payload determined to be the same as the corresponding payload from the previous deployment as not valid for a current deployment.

13. The computer-implemented method of claim 9, wherein the hash value is generated for each file of the plurality of files not included in an exclusion list.

14. The computer-implemented method of claim 13, wherein the exclusion list includes files that do not change the payload.

15. A system comprising:
   at least one processor; and
   memory encoding computer executable instructions that, when executed by the at least one processor, perform a method for deploying payloads in a cloud service, the method comprising:
   deploying a current version of a payload to a plurality of sample servers, where the payload includes a plurality of files;
   generating, at each sample server of the plurality of sample servers, a hash value for each file of the plurality of files;
   generating, at each sample server of the plurality of sample servers, a master hash value for the current version payload from the generated hashes for each file of the plurality of files;
   when a master hash value of a previous version of the current version payload is stored in a hash database, comparing the master hash value of the current version payload with the master hash value of the previous version payload; and
   when the master hash value of the current version payload is different from the master hash value of the previous version payload, marking the current version payload as valid for a current deployment.

16. The system of claim 15, further comprising:
   deploying a current version of another payload to the plurality of sample servers, where the another payload includes a plurality of files;
   generating, at each sample server of the plurality of sample servers, a hash value for each file of the plurality of files;
   generating, at each sample server of the plurality of sample servers, a master hash value for the current version another payload from the generated hashes for each file of the plurality of files;
   when a master hash value of a previous version of the current version another payload is stored in a hash database, comparing the master hash value of the current version another payload with the master hash value of the previous version another payload; and
   when the master hash value of the current version another payload is different from the master hash value of the previous version another payload, marking the current version another payload as valid for the current deployment.

17. The system of claim 16, further comprising when the master hash value of a previous version of the current version another payload is not stored in the hash database, storing the master hash value of the current version another payload in the hash database.

18. The system of claim 16, further comprising:
   when the master hash value of the current version payload is the same as the master hash value of the previous version payload, marking the current version payload as not valid for the current deployment; and
   when the master hash value of the current version another payload is the same as the master hash value of the previous version another payload, marking the current version another payload as not valid for the current deployment.

19. The system of claim 16, further comprising deploying the current version payload and the current version another payload to a plurality of data servers in the cloud service.

20. The system of claim 15, further comprising when the master hash value of a previous version of the current version payload is not stored in the hash database, storing the master hash value of the current version payload in the hash database.

* * * * *